WILLIAM C. BAKER.  Improvement in Oyster Dredges.
No. 121,227.  Patented Nov. 28, 1871.

Inventor
William C. Baker
by his Atty
Mason Fenwick Lawrence

Witnesses
R. T. Campbell
J. N. Campbell

UNITED STATES PATENT OFFICE.

WILLIAM CORNELIUS BAKER, OF BALTIMORE, MARYLAND, ASSIGNOR TO HIMSELF AND JACOB F. COOK, OF SAME PLACE.

IMPROVEMENT IN OYSTER-DREDGES.

Specification forming part of Letters Patent No. 121,227, dated November 28, 1871.

*To all whom it may concern:*

Be it known that I, WILLIAM CORNELIUS BAKER, of the city and county of Baltimore, in the State of Maryland, have invented Improvements in Oyster-Dredges; and I do hereby declare that the following is a full, clear, and exact description thereof, reference being had to the accompanying drawing making part of this specification, in which—

Figure 1:
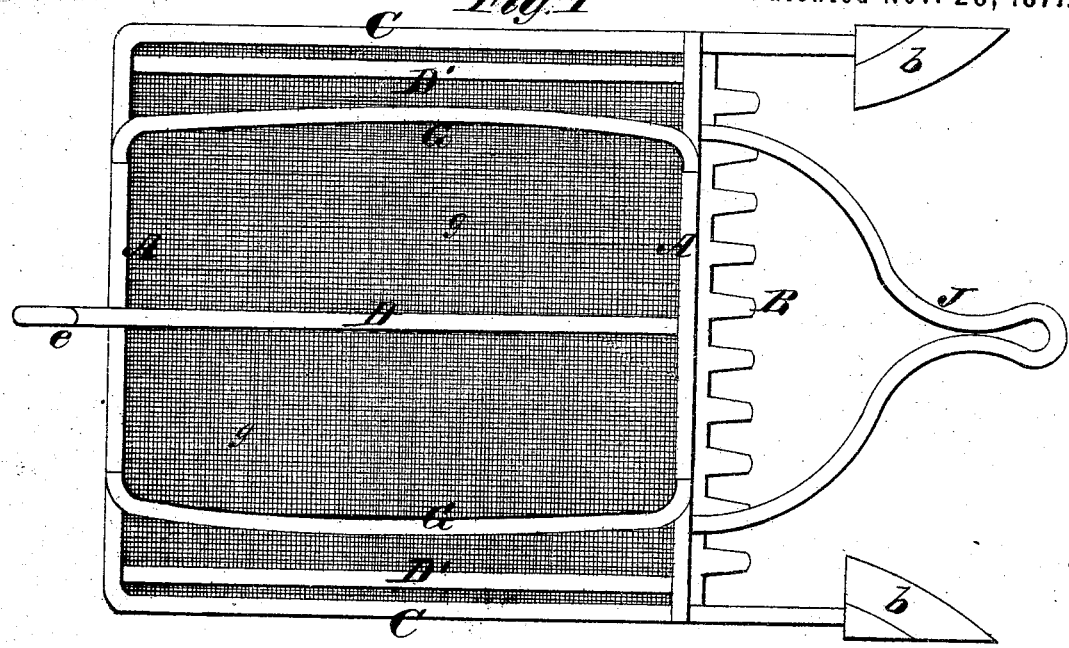
Figure 2:
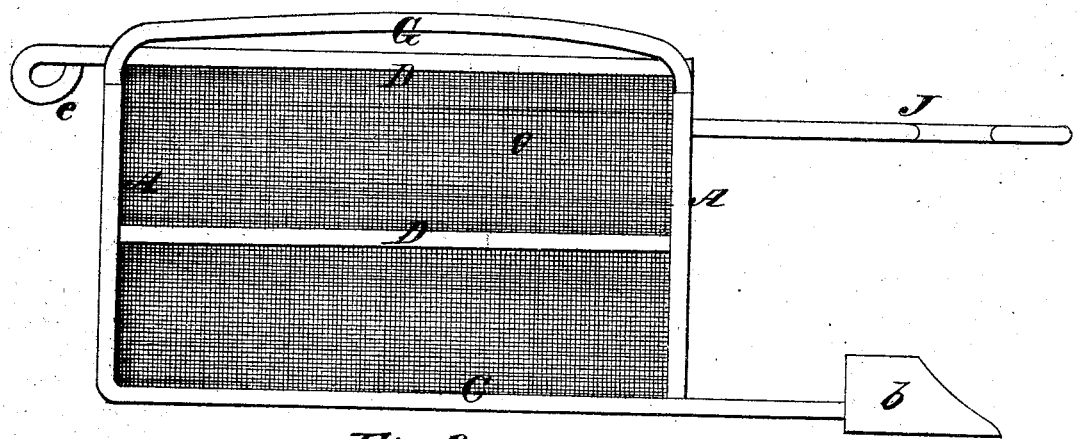
Figure 3:
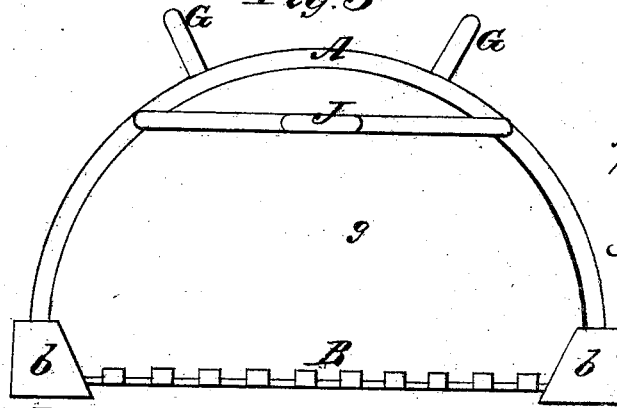

Figure 1 is a top view of the improved dredge. Fig. 2 is a view of one side thereof, and Fig. 3 is a front view.

Similar letters of reference indicate corresponding parts in the several figures.

This invention relates to certain novel improvements in oyster-dredges, wherein I employ an open arched cage for receiving the gathered load, plows and rake for gathering the load, guards or runners on top of the arched cage for easing the latter over the side of the vessel while hauling in, and finally a buoy-eye at the rear of the cage to receive a buoy-rope for allowing the cage to be drawn back out of the way, all as will be hereinafter explained.

The following description of my invention will enable others skilled in the art to understand it.

In the accompanying drawing I have represented an arched cage, which is composed of two arches, A A, longitudinal braces D D′ D′ and C C, a rear transverse brace, and a transverse rake, B, which also serves as a brace to the front arch A. These parts constitute the skeleton frame-work, the arched top, the bottom, and the rear end of which are covered with metallic netting $g$ of any suitable description. The two longitudinal side bars C C are extended forward a suitable distance, and carry plows $b\ b$ on their ends, the gathering surfaces of which are both directed inward and backward toward the center of the rake B. These plows loosen up the oysters from the bed and direct them into the cage. The front and rear arches A A have secured to them two longitudinal guards or runners, G G, which are arched more or less, and arranged equidistant from the central brace-rod D, as shown in Fig. 1. In hauling the loaded cage over the side of a boat it is important to avoid as much friction and wear as possible. To this end the guards G are employed, which will allow the cage to glide freely and unobstructedly over the boat's side and be emptied of its contents. The central longitudinal brace D extends out in rear of the cage and terminates in an eye, $e$. To this eye $e$ a rope is attached, having a buoy or float attached at its opposite end. The float is designed as a means for holding the end of the rope at the top of the water when the cage is overboard, so that it can be easily found when it is desired to haul back the dredge away from any obstruction which may be in its path. J represents a bail, to which the draft-rope or chain is attached.

Having thus described my invention, what I claim as new, and desire to secure by Letters Patent, is—

1. The plows $b\ b$ on an oyster-dredge, substantially as and for the purpose described.

2. The skeleton arched frame, formed of the bars A A and C D D′, for supporting the rake B, the open net-work $g$, bail J, and edge $e$, all constructed substantially as shown and described.

3. The runner-shaped guards G G, applied on the arches A A of the cage outside of the netting, for allowing the cage to glide easily over the sides of the boat, substantially as described.

WILLIAM CORNELIUS BAKER.

Witnesses:
JACOB F. COOK,
F. ALEXR. TAYLOR.

(143)